US007599775B2

(12) United States Patent
Furuno

(10) Patent No.: US 7,599,775 B2
(45) Date of Patent: Oct. 6, 2009

(54) OPERATION INFORMATION CONTROL DEVICE AND SYSTEM FOR A CONSTRUCTION MACHINE

(75) Inventor: Yoshinori Furuno, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 584 days.

(21) Appl. No.: 10/562,315

(22) PCT Filed: Sep. 14, 2004

(86) PCT No.: PCT/JP2004/013348

§ 371 (c)(1),
(2), (4) Date: Dec. 23, 2005

(87) PCT Pub. No.: WO2005/049927

PCT Pub. Date: Jun. 2, 2005

(65) Prior Publication Data

US 2006/0212203 A1 Sep. 21, 2006

(30) Foreign Application Priority Data

Nov. 18, 2003 (JP) ............................ 2003-388342

(51) Int. Cl.
*G06F 7/70* (2006.01)

(52) U.S. Cl. ............................ 701/50; 701/35; 701/31; 701/33

(58) Field of Classification Search ............ 701/29–36, 701/50, 99–102; 73/489; 360/5; 340/436
See application file for complete search history.

(56) References Cited

U.S. PATENT DOCUMENTS

| | | | | |
|---|---|---|---|---|
| 4,838,835 | A * | 6/1989 | Takano et al. | 474/13 |
| 6,349,252 | B1 | 2/2002 | Imanishi et al. | |
| 6,546,363 | B1 * | 4/2003 | Hagenbuch | 703/7 |
| 7,039,507 | B2 * | 5/2006 | Hagenbuch | 701/29 |

FOREIGN PATENT DOCUMENTS

| | | |
|---|---|---|
| JP | 2000-259729 | 9/2000 |
| JP | 2000-297443 | 10/2000 |
| JP | 2002-180502 | 6/2002 |
| JP | 2003-34954 | 2/2003 |

* cited by examiner

*Primary Examiner*—Richard M. Camby
(74) *Attorney, Agent, or Firm*—Mattingly & Malur, P.C.

(57) ABSTRACT

A data recording unit 60 for managing operating situations of a hydraulic excavator 1 comprises a RAM 67 for taking in and storing plural kinds of operational information regarding the hydraulic excavator 1 as operational data, and a CPU 65 for extracting top priority operational data from among the plural kinds of operational data stored in the RAM 67, and transmitting the extracted data to the supervising side via satellite communication. Top priority data among the plural kinds of operational data of the hydraulic excavator, which may bring the hydraulic excavator into rest, can be presented to a supervisor of the hydraulic excavator, etc.

7 Claims, 12 Drawing Sheets

FIG.6

| |
|---|
| CUMULATIVE DATA<br>CUMULATIVE ENGINE RUN TIME<br>CUMULATIVE OPERATING TIME PER PART<br>CUMULATIVE FREQUENCY DISTRIBUTION PER PART<br>... |
| TIME UNIT DATA [1]<br>TIME OF DAY<br>CUMULATIVE ENGINE RUN TIME<br>ENGINE RUN TIME<br>OPERATING TIME PER PART<br>FREQUENCY DISTRIBUTION PER PART<br>AVERAGE BLOWBY PRESSURE<br>AVERAGE FUEL CONSUMPTION<br>... |
| TIME UNIT DATA [2]<br>TIME OF DAY<br>CUMULATIVE ENGINE RUN TIME<br>ENGINE RUN TIME<br>OPERATING TIME PER PART<br>FREQUENCY DISTRIBUTION PER PART<br>AVERAGE BLOWBY PRESSURE<br>AVERAGE FUEL CONSUMPTION<br>... |

⋮

| |
|---|
| TIME UNIT DATA [n]<br>TIME OF DAY<br>CUMULATIVE ENGINE RUN TIME<br>ENGINE RUN TIME<br>OPERATING TIME PER PART<br>FREQUENCY DISTRIBUTION PER PART<br>AVERAGE BLOWBY PRESSURE<br>AVERAGE FUEL CONSUMPTION<br>... |
| EVENT/ALARM AND OTHER DATA<br>DATE CUMULATIVE ENGINE RUN TIME EVENT No.<br>DATE CUMULATIVE ENGINE RUN TIME EVENT No.<br>... |
| SNAPSHOT DATA<br>DATE EVENT No.<br>DATE EVENT No.<br>... |

FIG.9

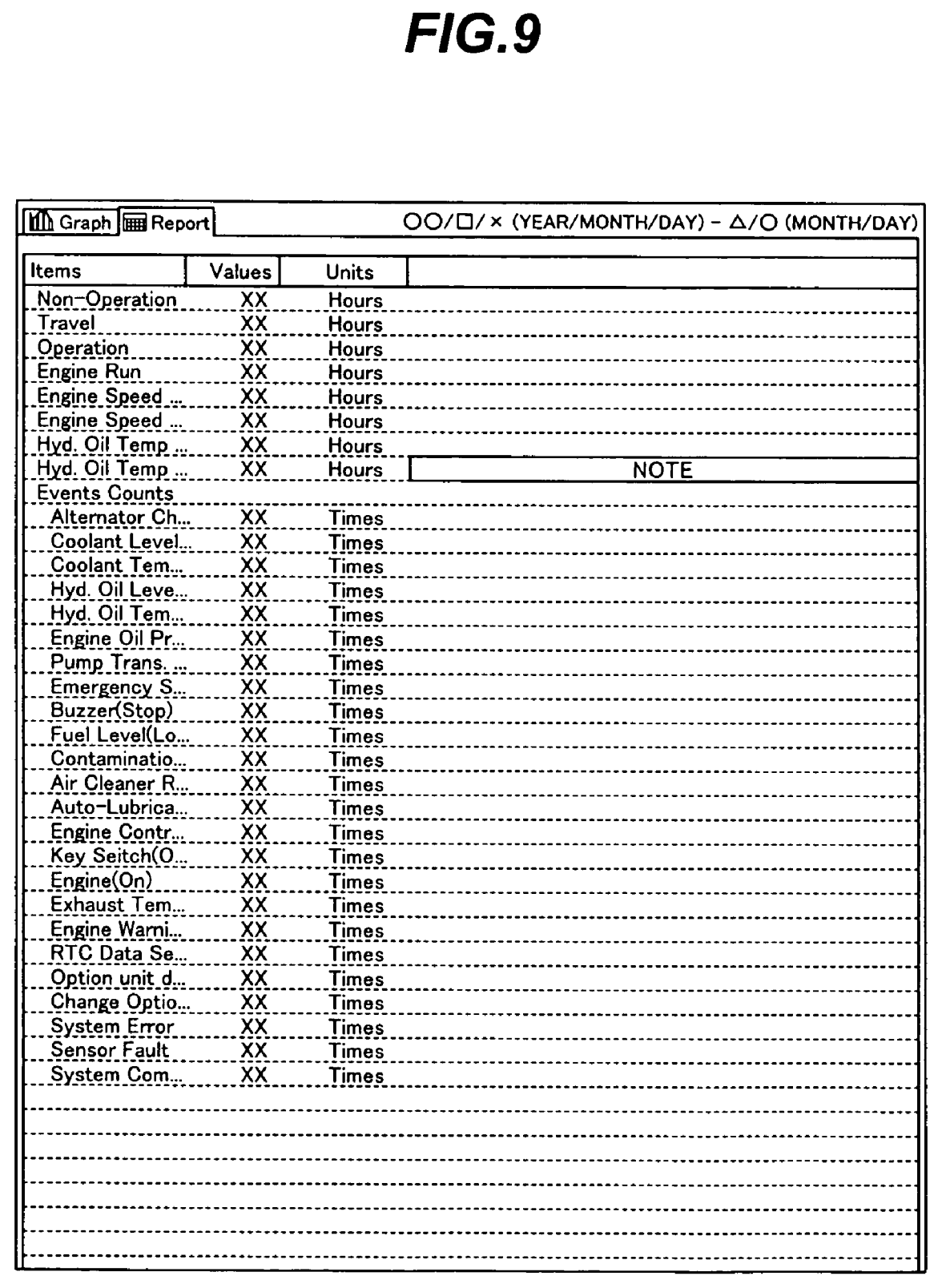

Graph | Report OO/□/× (YEAR/MONTH/DAY) - △/O (MONTH/DAY)

| Items | Values | Units | |
|---|---|---|---|
| Non-Operation | XX | Hours | |
| Travel | XX | Hours | |
| Operation | XX | Hours | |
| Engine Run | XX | Hours | |
| Engine Speed ... | XX | Hours | |
| Engine Speed ... | XX | Hours | |
| Hyd. Oil Temp ... | XX | Hours | |
| Hyd. Oil Temp ... | XX | Hours | NOTE |
| Events Counts | | | |
| Alternator Ch... | XX | Times | |
| Coolant Level... | XX | Times | |
| Coolant Tem... | XX | Times | |
| Hyd. Oil Leve... | XX | Times | |
| Hyd. Oil Tem... | XX | Times | |
| Engine Oil Pr... | XX | Times | |
| Pump Trans. ... | XX | Times | |
| Emergency S... | XX | Times | |
| Buzzer(Stop) | XX | Times | |
| Fuel Level(Lo... | XX | Times | |
| Contaminatio... | XX | Times | |
| Air Cleaner R... | XX | Times | |
| Auto-Lubrica... | XX | Times | |
| Engine Contr... | XX | Times | |
| Key Seitch(O... | XX | Times | |
| Engine(On) | XX | Times | |
| Exhaust Tem... | XX | Times | |
| Engine Warni... | XX | Times | |
| RTC Data Se... | XX | Times | |
| Option unit d... | XX | Times | |
| Change Optio... | XX | Times | |
| System Error | XX | Times | |
| Sensor Fault | XX | Times | |
| System Com... | XX | Times | |

OPERATION INFORMATION CONTROL DEVICE AND SYSTEM FOR A CONSTRUCTION MACHINE

TECHNICAL FIELD

The present invention relates to an operational information managing apparatus for a construction machine. More particularly, the present invention relates to an operational information managing apparatus for a construction machine, the apparatus being able to supply a supervisor, etc. with top priority data among plural kinds of operational data of a hydraulic excavator, which may bring the hydraulic excavator into rest, and also relates to an operational information managing system for a construction machine equipped with the apparatus.

BACKGROUND ART

A construction machine, particularly a large-sized hydraulic excavator or the like, is used, e.g., for excavation of earth and rocks in a large work site. Generally, such a large-sized hydraulic excavator is continuously operated in many cases for the purpose of increasing productivity. If there occurs an abnormality, it is required to stop the operation of the hydraulic excavator and repair it. Depending on the severity of the abnormality, the operation must be stopped for a long period. In that case, because production work with the hydraulic excavator is suspended, scheduling of a production plan must be changed.

In view of that background, to prevent the occurrence of failures, an information presenting system for construction machines is already known which, by utilizing the recent information communication technology, transmits information, such as operational data of construction machines all over the world, to one place, and collects operational information regarding all of the construction machines based on the transmitted data, thereby managing the operational information in a centralized manner (see, e.g., Patent Reference 1). According to that known related art, in each construction machine, the operating status of the construction machine is detected as operational data by operation sensors, and the operational data is periodically transported to a support center by an operational information managing apparatus (operational data communication apparatus). The support center receives the transmitted operational data, records the received data in a main database, and predicts the presence/absence of failures for each construction machine based on the operational data, thereby automatically outputting a report. Such a system configuration enables the failure prediction to be always made with a constant level of accuracy.

Patent Reference 1: JP,A 2000-259729

DISCLOSURE OF THE INVENTION

Generally, in the field of construction machines, a method for performing maintenance and management of the construction machines is primarily divided into two. According to one method, the maintenance and management are consigned to a construction machine maker (in practice, a selling company (so-called dealer), and according to the other method, the maintenance and management are performed by customers themselves.

In the case employing the former method, since the customer is not engaged in the maintenance and management of the construction machine, there is a need, for example, that the customer wants to know whether the construction machine is operated everyday in a remote site. On the other hand, in the case employing the latter method, since the customer is engaged in the maintenance and management, there is a need, for example, that the customer wants to confirm trends of various kinds of operational data and, upon the occurrence of an alarm, to know detailed data in respective periods before and after the occurrence of the alarm for the purpose of clarifying the cause of the alarm occurrence. Thus, the kinds of operational data demanded by the customer regarding the construction machine operating in the remote site differ depending on the customer's intentions.

However, because the large-sized hydraulic excavator is required to continuously operate for the purpose of increasing productivity as described above, it is an essential demand common to both the aforesaid methods that the downtime caused by the failure must be minimized. It is therefore important to provide information, which may bring a hydraulic excavator into rest because of the necessity of repair, maintenance, etc., to the maker (dealer) or the customer of the hydraulic excavator in an accurate way.

From that point of view, according to the above-mentioned Patent Reference 1, the support center takes in items regarding the detailed operating status, such as the exhaust temperature, the exhaust pressure, the lubricant temperature, the temperature and pressure of working oil, the cooling water temperature, and the engine revolution speed, and then makes diagnosis of operating situations of the hydraulic excavator. When trying to manage operating situations of the hydraulic excavator, however, the disclosed method takes a very long processing time for the diagnosis, and the hydraulic excavator may be brought into rest during work while the processing is executed. Particularly, in the case managing a plurality of hydraulic excavators, such a potential risk is increased, and the management equipment and cost required for the diagnosis are also increased.

For that reason, as described above, it is required to provide the most important item of the operational data, which may bring the hydraulic excavator into rest, to the supervisor, etc. in a prompt and accurate way. Up to now, however, a sufficient consideration has not been paid to that point.

The present invention has been made in view of the above-mentioned state of the art, and its object is to provide an operational information managing apparatus for a construction machine, the apparatus being able to supply a supervisor, etc. with top priority data among plural kinds of operational data of a hydraulic excavator, which may bring the hydraulic excavator into rest, and to an operational information managing system for a construction machine equipped with the apparatus.

(1) To achieve the above object, a first aspect of the present invention resides in an operational information managing apparatus for use in a construction machine to manage operating situations of the construction machine, wherein the apparatus comprises storage means for taking in and storing plural kinds of operational information regarding the construction machine as operational data; and control means for extracting top priority operational data from among the plural kinds of operational data stored in the storage means.

In the operational information managing apparatus of the present invention, the plural kinds of operational information regarding the construction machine are stored as operational data in the storage means, and the top priority operational data selected, for example, by the supervising side (i.e., a customer and a maker, etc.) from among the plural kinds of operational data stored in the storage means is extracted and transmitted to the supervising side by the control means.

With that feature, unlike the related art wherein detailed operational data regarding the operating status are all transmitted to the supervising side from the viewpoint of reducing the downtime, the top priority operational data which may bring the construction machine into rest and is truly required by the supervising side can be selectively presented to the supervising side. As a result, it is possible to eliminate the drawback experienced with the related art, i.e., the disadvantage that a very long processing time is required to make diagnosis on a large amount of the operational data and the hydraulic excavator may be brought into rest during work while the processing is executed, and to suppress a reduction of productivity caused by the rest of the construction machine. In addition, the management equipment and cost required for the diagnosis can be reduced.

(2) To achieve the above object, a second aspect of the present invention resides in an operational information managing apparatus for use in a construction machine to manage operating situations of the construction machine, wherein the apparatus comprises storage means for taking in and storing plural kinds of operational information regarding the construction machine as operational data; and control means for extracting top priority operational data from among the plural kinds of operational data stored in the storage means, and outputting the extracted data to the supervising side.

(3) To achieve the above object, a third aspect of the present invention resides in an operational information managing apparatus for use in a construction machine to manage operating situations of the construction machine, wherein the apparatus comprises storage means for taking in and storing plural kinds of operational information regarding the construction machine as operational data; and control means for extracting preset top priority operational data from among the plural kinds of operational data stored in the storage means, and outputting the extracted data to the supervising side.

(4) To achieve the above object, a fourth aspect of the present invention resides in an operational information managing apparatus for use in a construction machine to manage operating situations of the construction machine, wherein the apparatus comprises storage means for taking in and storing plural kinds of operational information regarding the construction machine as operational data; and control means for extracting selectively-set top priority operational data from among the plural kinds of operational data stored in the storage means, and outputting the extracted data to the supervising side.

(5) To achieve the above object, a fifth aspect of the present invention resides in the operational information managing apparatus for the construction machine according to any one of Claims 1 to 4, wherein the control means includes computing means for computing, as the top priority operational data, operational data containing a cumulative run time of an engine based on the operational data stored in the storage means.

Generally, in the field of construction machines, a method for performing maintenance and management of the construction machines is primarily divided into two. According to one method, the maintenance and management are consigned to a construction machine maker (in practice, a selling company (so-called dealer), and according to the other method, the maintenance and management are performed by customers themselves.

In the case employing the former method, since the customer is not engaged in the maintenance and management of the construction machine, there is a need, for example, that the customer wants to know whether the construction machine is operated everyday in a remote site.

In view of that need, with the present invention, by selecting an item of cumulative engine run time on the customer side, for example, the operational information managing apparatus can operate such that the computing means computes the cumulative run time of the engine based on the operational data stored in the storage means, and then transmits the computed run time data. Therefore, the customer can confirm from the cumulative engine run time data whether the hydraulic excavator is operated everyday in a remote site, and the need on the customer side can be satisfied with the least necessary operational data.

(6) To achieve the above object, a sixth aspect of the present invention resides in the operational information managing apparatus for the construction machine according to any one of Claims 1 to 4, wherein the control means includes computing means for computing, as the top priority operational data, operational data containing an operating time per 30 minutes or an average engine load factor based on the operational data stored in the storage means.

With that feature, the operational information managing apparatus is adaptable for such a need on the supervising side as wanting to know only production information (i.e., the operating time per 30 minutes or the average engine load factor) without requiring detailed operational information.

(7) To achieve the above object, a seventh aspect of the present invention resides in the operational information managing apparatus for the construction machine according to any one of Claims 1 to 4, wherein the control means includes computing means for computing, as the top priority operational data, operational data containing alarm information and snapshot information regarding a relevant alarm based on the operational data stored in the storage means.

For example, when an alarm occurs in the construction machine operating in a remote site, there is a need that the supervising side wants to know the occurrence of the alarm in an as close as possible real-time way. With the present invention, upon the occurrence of the alarm, the computing means computes the alarm information and the snapshot information regarding the relevant alarm based on the operational data stored in the storage means, and then transmits the computed data to the supervising side. As a result, it is possible to satisfy the need of wanting to know the occurrence of the alarm in real time on the supervising side, and to analyze the cause of the alarm occurrence based on the transmitted snapshot data.

(8) To achieve the above object, an eighth aspect of the present invention resides in the operational information managing apparatus for the construction machine according to any one of Claims 1 to 7, wherein the control means includes a control unit for optionally changing a transmission cycle of the operational data.

With that feature, the operational information managing apparatus is adaptable for such a need on the supervising side that the operational data (daily report) provided, e.g., everyday per 24 hours is not sufficient and the supervising side wants to more finely confirm the operating situation of the construction machine. Conversely, the operational information managing apparatus is also adaptable for such a customer's need as caused when the daily report is not necessary and the supervising side is just required to confirm the operating situation at intervals of several days and wants to cut the communication cost correspondingly.

(9) To achieve the above object, a ninth aspect of the present invention resides in the operational information managing apparatus for the construction machine according to any one of Claims 1 to 8, wherein the control means includes a control unit for acquiring snapshot information in sync with display control means which displays the operational data of the construction machine on display means as required.

(10) To achieve the above object, a tenth aspect of the present invention resides in the operational information managing apparatus for the construction machine according to any one of Claims 1 to 9, wherein the storage means takes in and stores the operational data of the construction machine, which includes a first kind of operational data regarding the operating status of an engine and a second kind of operational data regarding a body of the construction machine and the operating status of an electric lever thereof.

(11) To achieve the above object, an eleventh aspect of the present invention resides in an operational information managing system for a construction machine, the system comprising a first communication network including an engine monitor unit for detecting operational data regarding the operating status of an engine; a second communication network including a machine body control unit for detecting operational data regarding a body of a construction machine and an electric lever control unit for detecting operational data regarding the operating status of an electric lever of the construction machine; and an operational information managing apparatus connected to the first communication network and the second communication network, taking in a third kind of operational data from the first communication network and a fourth kind of operational data from the second communication network, and computing and outputting top priority operational data based on the third kind of operational data and the fourth kind of operational data.

(12) To achieve the above object, a twelfth aspect of the present invention resides in the operational information managing system for the construction machine according to Claim 11, the system further comprising display control means for outputting the third kind of operational data from the first communication network and the fourth kind of operational data from the second communication network to display means as required.

(13) To achieve the above object, a thirteenth aspect of the present invention resides in the operational information managing system for the construction machine according to Claim 12, wherein the operational information managing apparatus includes control means for acquiring snapshot information in sync with the display control means.

(14) To achieve the above object, a fourteenth aspect of the present invention resides in the operational information managing system for the construction machine, wherein the operational information managing apparatus is the operational information managing apparatus according to any one of Claims 2 to 8.

BRIEF DESCRIPTION OF THE DRAWINGS

FIG. 6 is a table representing one example of a data structure of operational data produced as a result of the processing shown in the flowchart of FIG. 5.

FIG. 9 shows, in the form of a list, one example of life data displayed on the maker-side server and the user-side personal computer when the option 3 is selected.

REFERENCE NUMERALS

1 hydraulic excavator (construction machine)

2 controller network (operational information managing system)

2A first network (first communication network)

2B second network (second communication network)

51L, 51R engine monitor unit

52 machine body control unit

53 electric lever control unit

54 display (display means)

55 display control unit (display control means)

60 data recording unit (operational information managing apparatus)

65 CPU (control means; processing means; control unit)

67 RAM (storage means)

BEST MODE FOR CARRYING OUT THE INVENTION

One embodiment of an operational information managing apparatus for a construction machine according to the present invention and an operational information managing system for a construction machine equipped with the apparatus will be described below with reference to the drawings. This embodiment represents the case where the operational information managing apparatus for the construction machine according to the present invention and the operational information managing system for the construction machine equipped with the apparatus are applied to the so-called super-large-sized hydraulic excavator including two engines and belonging to a class with the body weight of several hundreds tons, which is employed in, e.g., overseas mines in many cases.

Figure 1:
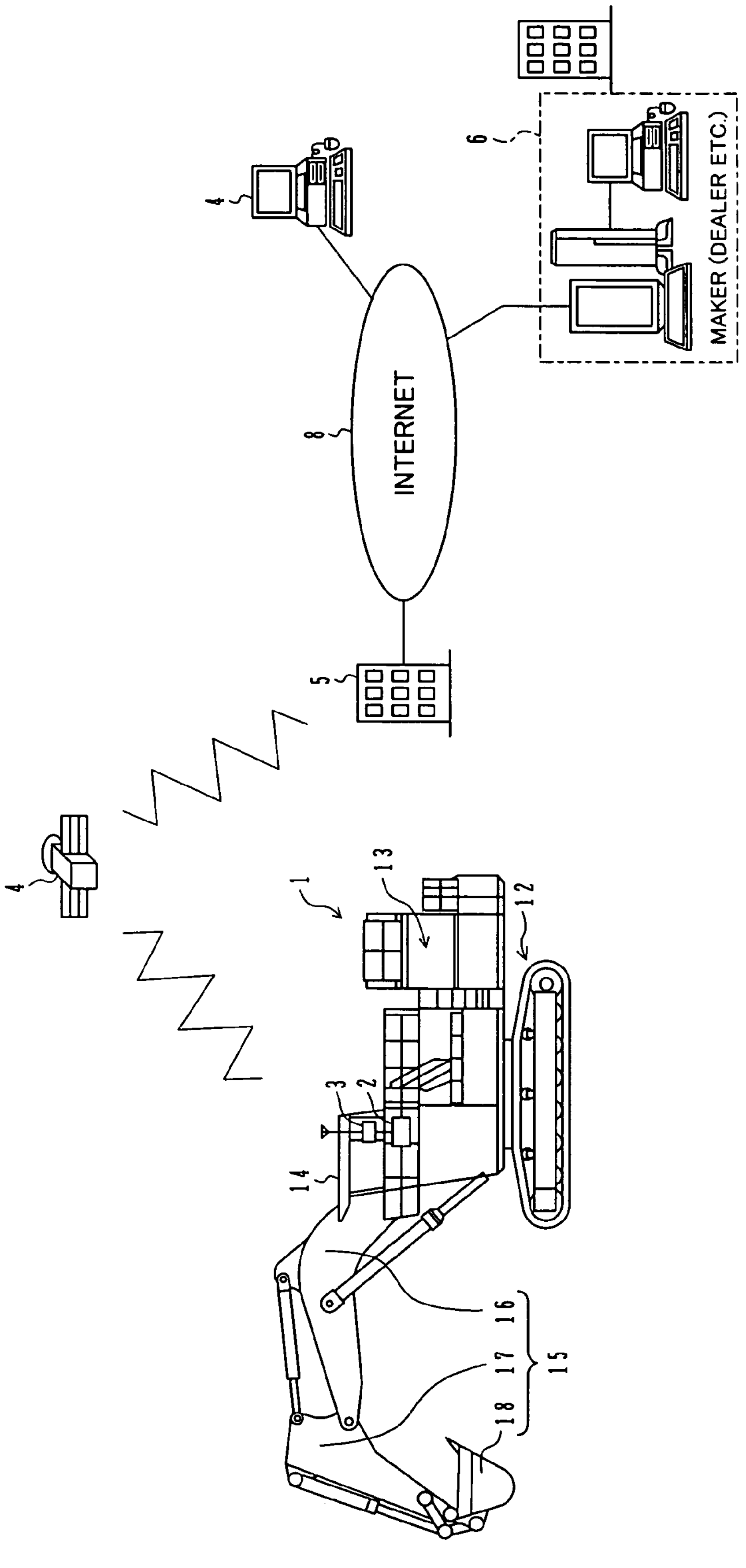
FIG. 1 is an overall schematic view of an information presenting system for presenting operational data, to the supervising side via satellite communication, from a hydraulic excavator including one embodiment of an operational information managing apparatus for a construction machine according to the present invention and an operational information managing system for a construction machine equipped with the apparatus.

FIG. 1 is an overall schematic view of an information presenting system for presenting operational data, to the supervising side via satellite communication, from a hydraulic excavator including one embodiment of the operational information managing apparatus for the construction machine according to the present invention and the operational information managing system for the construction machine equipped with the apparatus. In FIG. 1, numeral 1 denotes a plurality of hydraulic excavators operating in work sites (only typical one of those hydraulic excavators being shown in FIG. 1), 2 denotes a controller network (operational information managing system) installed in the hydraulic excavator 1, and 3 denotes a satellite communication terminal connected to the controller 2. Numeral 4 denotes a communication satellite, 5 denotes a base station, 6 denotes a server installed on the side of a maker of the hydraulic excavator 1 (including a selling company (dealer), a branch office, an agency, etc. that is engaged in services of maintenance, etc. in direct relation to each user (customer); hereinafter referred to as a "maker, etc."), and 7 denotes a personal computer installed on the user (customer) side. The base station 5, the server 6 on the side of the maker, etc., and the user-side personal computer 7 are interconnected via information communication using a communication line (such as the Internet using a public line) 8.

Further, numeral 12 denotes a travel body, and 13 denotes a swing body mounted on the travel body 12 in a swingable manner. Numeral 14 denotes a cab provided in a front left portion of the swing body 13, and 15 denotes a front operating mechanism (excavating device) mounted to a front central portion of the swing body 13 in a vertically angularly movable manner. Those components constitute the hydraulic excavator 1. Numeral 16 denotes a boom rotatably mounted to the swing body 13, 17 denotes an arm rotatably mounted to a fore end of the boom 16, and 18 denotes a bucket rotatably mounted to a fore end of the arm 17. The front operating mechanism 15 is made up of the boom 16, the arm 17, and the bucket 18.

Figure 2:
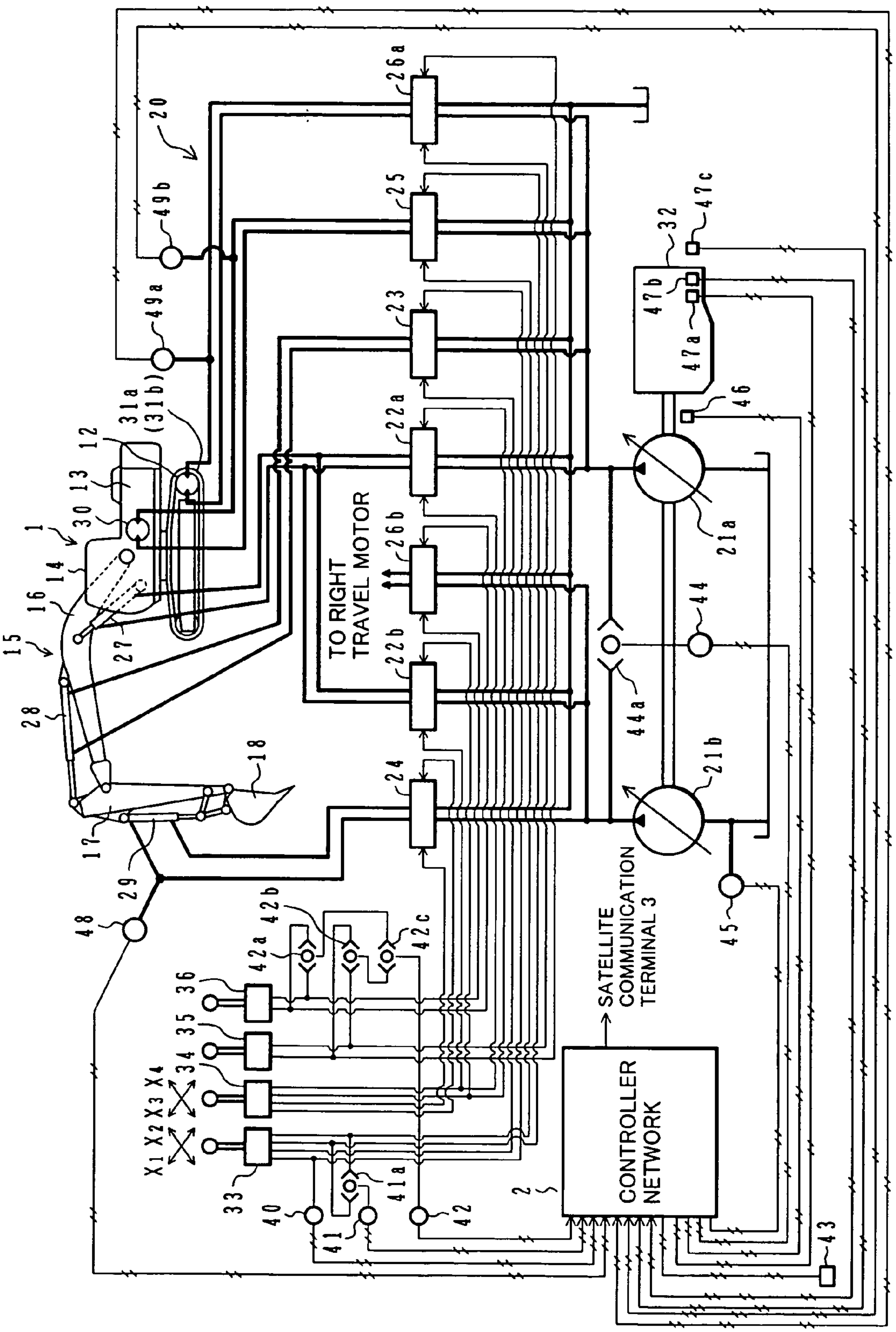
FIG. 2 is a diagram schematically showing one example of a hydraulic system, along with sensors, installed in a hydraulic excavator to which one embodiment of the operational information managing system for the construction machine according to the present invention is applied.

FIG. 2 is a diagram schematically showing one example of a hydraulic system, along with sensors, installed in the hydraulic excavator 1 to which one embodiment of the operational information managing system for the construction machine according to the present invention is applied. Note that, although the hydraulic excavator 1 in this embodiment is a super-large-scaled hydraulic excavator including two engines such as mentioned above, FIG. 2 is illustrated in the simplified form including one engine for the sakes of avoiding intricacy and facilitating understanding.

In FIG. 2, numerals 21*a*, 21*b* denote hydraulic pumps, 22*a*, 22*b* denote boom control valves, 23 denotes an arm control valve, 24 denotes a bucket control valve, 25 denotes a swing control valve, and 26*a*, 26*b* denote travel control valves. Numeral 27 denotes a boom cylinder, 28 denotes an arm cylinder, 29 denotes a bucket cylinder, 30 denotes a swing motor 30, and 31*a*, 31*b* denote travel motors. Those components are included in a hydraulic system 20 that is installed in the hydraulic excavator 1.

The hydraulic pumps 21*a*, 21*b* are driven for rotation by an engine 32 (in fact, the hydraulic excavator 1 includes a pair of left- and right-side engines 32L, 32R, but only one engine 32 is shown in FIG. 2; hereinafter also referred to as "engines 32L, 32R" as required) provided with a fuel injection device (not shown) of the so-called electronic governor type, and they deliver a hydraulic fluid. The control valves 22*a*, 22*b*-26*a*, 26*b* control respective flows (flow rates and flowing directions) of the hydraulic fluid supplied from the hydraulic pumps 21*a*, 21*b* to the hydraulic actuators 27-31*a*, 31*b*, and the hydraulic actuators 27-31*a*, 31*b* drive the boom 16, the arm 17, the bucket 18, the swing body 13, and the travel body 12. The hydraulic pumps 21*a*, 21*b*, the control valves 22*a*, 22*b*-26*a*, 26*b*, and the engine 32 are mounted in an accommodation room (engine room) in a rear portion of the swing body 13.

Numeral 33, 34, 35 and 36 denote control lever devices disposed corresponding to the control valves 22*a*, 22*b*-26*a*, 26*b*. Though not shown for the sake of avoiding intricacy, the control lever devices 33, 34, 35 and 36 are each made up of an electric lever and a proportional solenoid valve. An electric signal from each electric lever is inputted to the controller network 2 (more specifically, to an electric lever control unit 53 described later), and an electric signal depending on a control input applied with the manipulation of the electric lever is outputted from the controller network 2 to each corresponding proportional solenoid valve. Then, an original pilot pressure is reduced by the proportional solenoid valve depending on the control input applied with the manipulation of the electric lever, and the produced pilot pressure is outputted from corresponding one of the control lever devices 33, 34, 35 and 36. More specifically, for example, when a control lever of the control lever device 33 is manipulated in one X1 of two crossed directions, an arm-crowding pilot pressure or an arm-dumping pilot pressure is produced and applied to the arm control valve 23. When the control lever of the control lever device 33 is manipulated in the other X2 of the two crossed directions, a rightward-swing pilot pressure or a leftward-swing pilot pressure is produced and applied to the swing control valve 25.

On the other hand, when a control lever of the control lever device 34 is manipulated in one X3 of two crossed directions, a boom-raising pilot pressure or a boom-lowering pilot pressure is produced and applied to the boom control valves 22*a*, 22*b*. When the control lever of the control lever device 34 is manipulated in the other X4 of the two crossed directions, a bucket-crowding pilot pressure or a bucket-dumping pilot pressure is produced and applied to the bucket control valve 24. Further, when control levers of the control lever devices 35, 36 are manipulated, a left-travel pilot pressure and a right-travel pilot pressure are produced and applied to the travel control valves 26*a*, 26*b*. The control lever devices 33 to 36 are disposed in the cab 14 along with the controller network system 2.

Numerals 40-49 denote various sensors disposed in the hydraulic system 20 described above. The sensor 40 is a pressure sensor for detecting, as an operation signal of the front operating mechanism 15, the arm-crowding pilot pressure in this embodiment, and the sensor 41 is a pressure sensor for detecting, as a swing operation signal, the swing pilot pressure taken out through a shuttle valve 41a. The sensor 42 is a pressure sensor for detecting, as a travel operation signal, the travel pilot pressure taken out through shuttle valves 42a, 42b and 42c.

The sensor 43 is a sensor for detecting an ON/OFF state of a key switch for the engine 32, the sensor 44 is a pressure sensor for detecting the delivery pressure of the hydraulic pumps 21a, 21b, i.e., the pump pressure, taken out through a shuttle valve 44a, and the sensor 45 is an oil temperature sensor for detecting the temperature of working oil (i.e., the oil temperature) in the hydraulic system 20. The sensor 46 is a revolution speed sensor for detecting the revolution speed of the engine 32. The sensor 47a is a fuel sensor for detecting the amount of fuel injected by the fuel injection device (not shown) of the engine 32 (i.e., the fuel consumption), the sensor 47b is a pressure sensor for detecting the blowby pressure in a cylinder of the engine 32, and the sensor 47c is a temperature sensor for detecting the temperature of a cooling water (radiator water) for cooling the engine 32 (in fact, the above-mentioned sensors 46, 47a, 47b and 47c are disposed for each of the left- and right-side engines 32L, 32R, but they are each shown as one sensor in FIG. 2; hereinafter the sensors 46, 47a, 47b and 47c will be also referred to as the "sensors 46L, 46R, 47aL, 47aR, 47bL, 47bR, 47cL and 47cR" as required).

The sensor 48 is a pressure sensor for detecting, as a digging pressure applied from the front operating mechanism 15, the pressure on the bottom side of the bucket cylinder 29 in this embodiment (or on the bottom side of the arm cylinder 28). The sensor 49a is a pressure sensor for detecting the travel pressure, i.e., the pressure of the travel motor 31a or 31b (for example, a maximum one of the pressures of both the travel motors may be taken out through a shuttle valve not shown), and the sensor 49b is a pressure sensor for detecting the swing pressure, i.e., the pressure of the swing motor 30. Detected signals from those sensors 40 to 49 are all sent to and collected in the controller network 2.

Figure 3:
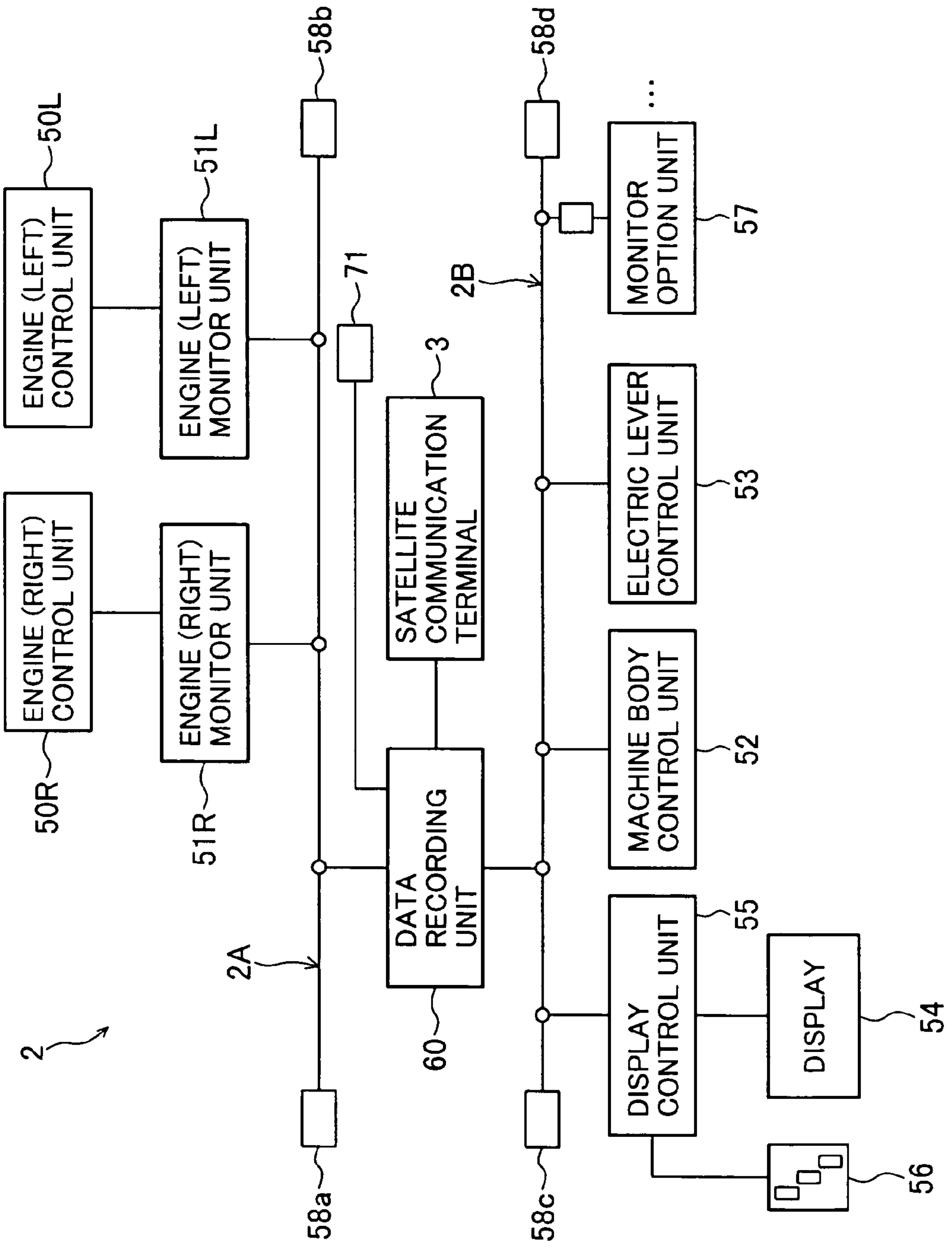
FIG. 3 is a block diagram schematically showing an overall configuration of a controller network that is one embodiment of the operational information managing system for the construction machine according to the present invention.

The controller network 2 collects data regarding the machine operating status for each part of the hydraulic excavator 1 (hereinafter referred to simply as "operational data"). FIG. 3 is a block diagram schematically showing an overall configuration of the controller network 2.

In FIG. 3, numerals 50L, 50R denote left- and right-side engine control units for executing control of the left- and right-side engines 32L, 32R, respectively. The left- and right-side engine control units 50L, 50R receive, e.g., the engine revolution speeds detected by the engine revolution speed sensors 46L, 46R, the fuel injection amounts detected by the fuel sensors 47aL, 47aR, etc., and control the fuel injection devices, thereby controlling the respective engine revolution speeds of the engines 32L, 32R. Numerals 51L, 51R denote left- and right-side engine monitor units for detecting the operational data regarding the respective run statuses of the left- and right-side engines 32L, 32R. The left- and right-side engine monitor units 51L, 51R receive, e.g., the blowby pressures in respective cylinders of the left- and right-side engines 32L, 32R detected by the pressure sensors 47bL, 47bR, the cooling water temperatures of the left- and right-side engines 32L, 32R detected by the temperature sensors 47cL, 47cR, etc.

The engine monitor units 51L, 51R are connected to a later-described data recording unit (operational information managing apparatus) 60 via a first network (first communication network) 2A. The operational data (hereinafter referred to also as "engine related data (first kind of operational data; third kind of operational data" as required)) regarding the respective run statuses of the engines 32L, 32R, which are detected by the sensors and inputted to the engine control units 50L, 50R and the engine monitor units 51L, 51R, are inputted to the data recording unit 60 via the first network 2A. Moreover, numerals 58a, 58b denote terminating resistors disposed at terminal ends of the first network 2A.

Also, numeral 52 denotes a machine body control unit for executing control related to a body of the hydraulic excavator 1 and detecting the operational data regarding the machine body. For example, the machine body control unit 52 receives the delivery pressure of the hydraulic pumps 21a, 21b detected by the pressure sensor 44, and controls respective delivery rates of the hydraulic pumps 21a, 21b through a regulator unit (not shown) in accordance with the received delivery pressure so that a total of input torques of the hydraulic pumps 21a, 21b is held not larger than an output torque of the engines 32, thereby executing the so-called total horsepower control. Further, the machine body control unit 52 receives the working oil temperature in the hydraulic system 20 detected by the oil temperature sensor 45 and executes control of, e.g., an oil cooler fan motor (not shown) so that the working oil temperature is held constant. In addition, the key switch ON/OFF signal for each engine 32, which is outputted from the sensor 43, is also inputted to the machine body control unit 52.

Numeral 53 denotes an electric lever control unit for executing control related to the electric levers and detecting the operational data regarding respective operating statuses of the electric levers. The electric lever control unit 53 receives the arm-crowding pilot pressure detected by the pressure sensor 40, the swing pilot pressure detected by the pressure sensor 41, the travel pilot pressure detected by the pressure sensor 42, the travel pressure detected by the pressure sensor 49a, the swing pressure detected by the pressure sensor 49b, etc. Further, as described above, the electric lever control unit 53 controls the proportional solenoid valve depending on the control input applied with the manipulation of the electric lever for each of the control lever devices 33, 34, 35 and 36, and reduces the original pilot pressure by the proportional solenoid valve, and produces the pilot pressure depending on the control input applied with the manipulation of the electric lever.

Numeral 54 denotes a display (display means) disposed in the cab 14 and displaying various kinds of operational information regarding the hydraulic excavator 1, alarm information, etc. for presentation to the operator. Numeral 55 denotes a display control unit (display control means) for executing control related to display made on the display 54. Further, numeral 56 denotes a keypad connected to the display control unit 55 and used for making, e.g., various kinds of data settings and changing screens with the input operation of the operator.

Additionally, numeral 57 denotes an option unit related to other monitor functions, such as a contamination sensing unit for detecting the contaminated state of a drain of each hydraulic motor.

The machine body control unit 52, the electric lever control unit 53, the display control unit 55, and the option unit 57 are connected to the later-described data recording unit (operational information managing apparatus) 60 via a second network (second communication network) 2B. With such an arrangement, the operational data (hereinafter referred to also as "machine body related data (second kind of operational data; fourth kind of operational data") as required) regarding the body of the hydraulic excavator 1, which are detected by the sensors and inputted to the machine body control unit 52, the electric lever control unit 53 and the option unit 57, etc. are inputted to the data recording unit 60 and the display control unit 55 via the second network 2B. Moreover, numerals 58*c*, 58*d* denote terminating resistors disposed at terminal ends of the second network 2B.

Numeral 60 denotes the data recording unit connected to the first network 2A and the second network 2B to take in respectively the engine related data from the first network 2A and the machine body related data the second network 2B. Further, the data recording unit 60 executes recording and processing to transmit the engine related data and the machine body related data via the satellite communication terminal 3, or to download those data in a portable terminal 71.

Figure 4:
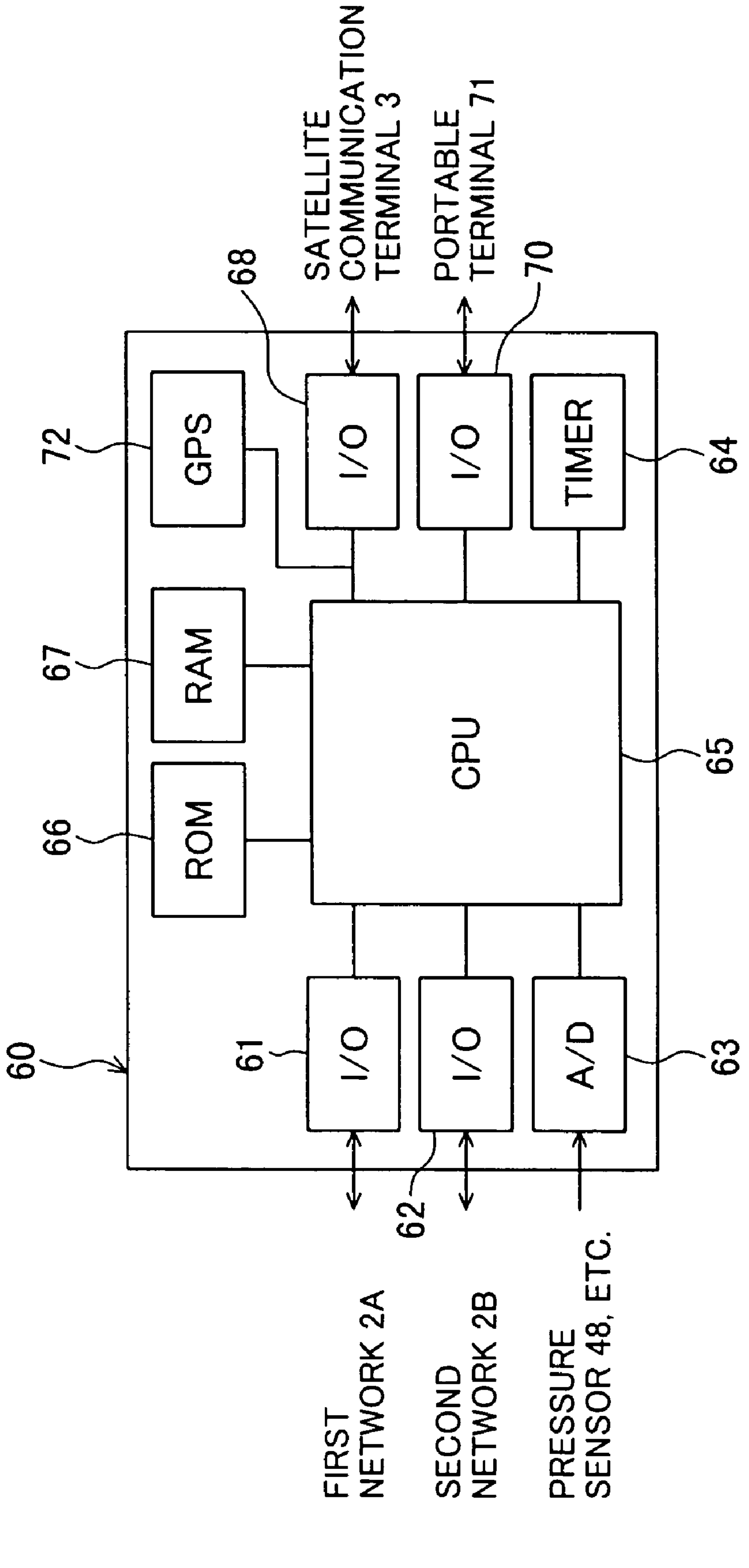
FIG. 4 is a block diagram schematically showing an internal configuration of a data recording unit that is one embodiment of the operational information managing apparatus for the construction machine according to the present invention.

FIG. 4 is a block diagram schematically showing an internal configuration of the data recording unit.

In FIG. 4, numeral 61 denotes an input/output interface between the data recording unit 60 and the first network 2A, and 62 denotes an input/output interface between the data recording unit 60 and the second network 2B. Numeral 63 denotes an A/D conversion interface for converting an analog signal, such as the bottom-side pressure of the bucket cylinder 29 detected by the pressure sensor 48, to a digital signal, and 64 denotes a timer. Numeral 65 denotes a CPU (control means, processing means, or a control unit) for processing, into predetermined operational data, various kinds of operational information regarding the hydraulic excavator 1 inputted via those interfaces 61, 62 and 63 at intervals of a certain time (e.g., 30 minutes) by using the timer 64, extracting predetermined (top priority) operational data from among the processed operational data, and transmitting the extracted operational data via satellite communication per, e.g., 24 hours. Numeral 66 denotes a ROM (Read Only Memory) for storing control programs that operate the CPU 65 to execute computing operations, such as the above-mentioned data processing and extraction, and 67 denotes a RAM (Random Access Memory, storage means) for temporarily storing data having been computed or being under computation by the CPU 65. Numeral 68 denotes a communication interface between the data recording unit 60 and the satellite communication terminal 3, and 70 denotes a communication interface between the data recording unit 60 and a portable terminal 71 capable of being carried with the operator, etc. (which may be replaced with a PC or the like). Numeral 72 denotes a GPS module for obtaining position data of the hydraulic excavator 1 via communication with a GPS satellite (not shown), and adding the position data to the operational data outputted from the CPU 65 to the satellite communication terminal 3.

Figure 5:
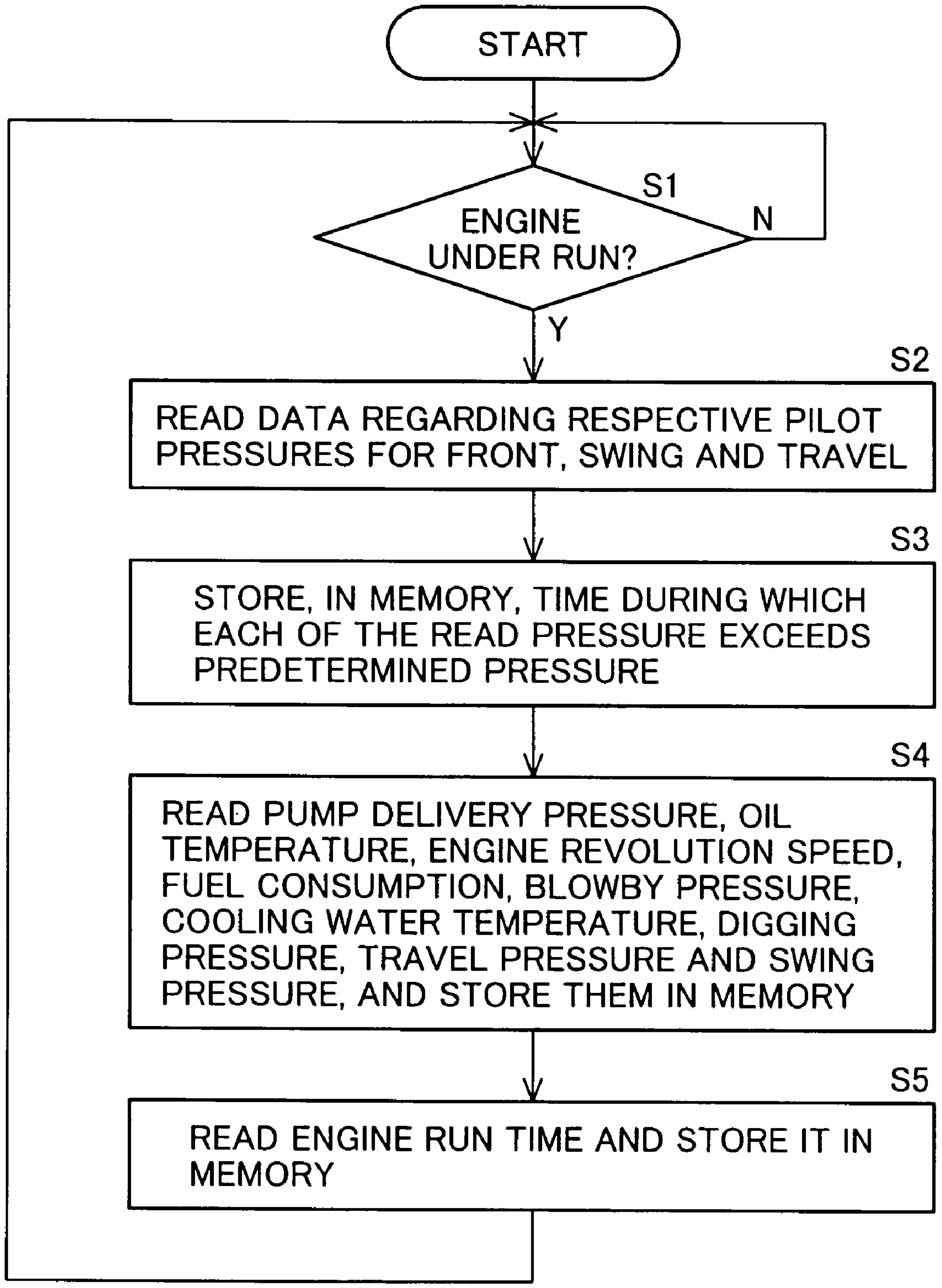
FIG. 5 is a flowchart showing the processing function executed by a CPU that constitutes one embodiment of the operational information managing apparatus for the construction machine according to the present invention.

The various kinds of operational information regarding the hydraulic excavator 1 are inputted to the CPU 65 from the first and second networks 2A, 2B, the pressure sensor 48, etc. via the interfaces 61, 62 and 63 per unit time (e.g., 1 second). Then, as described above, the CPU 65 processes the inputted various kinds of operational information regarding the hydraulic excavator 1 into the predetermined data structure in accordance with the control programs read out of the ROM 66, and stores the processed data in the RAM 67. FIG. 5 is a flowchart showing the processing function executed by the CPU 65 on that occasion, and FIG. 6 is a table representing one example of the data structure of the operational data produced as a result of the processing shown in FIG. 5.

In FIG. 5, the CPU 65 first determines whether the engine 32 is under run (step 1). Practically, this determination can be made, for example, by reading data regarding the detected signal of the engine revolution speed from the sensor 46 and checking whether the read data exceeds a predetermined value of the engine revolution speed, or by reading data regarding the key switch ON/OFF signal for the engine 32 detected by the sensor 43 and checking whether the detected signal is turned ON. If it is determined that the engine 32 is not under run, the CPU repeats step 1.

If it is determined that the engine 32 is under run, the CPU proceeds to step 2 and reads data regarding the detected signals of the respective pilot pressures for the front operating mechanism, the swing and the travel from the sensors 40, 41 and 42 (step 2). Then, for each of the respective pilot pressures for the front operating mechanism, the swing and the travel, the CPU calculates a time during which the pilot pressure exceeds a predetermined pressure (i.e., a level of the pilot pressure at which the front operating mechanism, the swing or the travel can be regarded as being operated), and stores and accumulates the calculated time in the RAM 67 in correspondence to the date and the time-of-day (step 3) by using time information from the timer 64. Instead of detecting the operating statuses of the front operating mechanism, the swing and the travel in the above-mentioned manner, those operating statuses may be detected based on the respective control inputs (electric signals) applied with the manipulation of the electric levers of the control lever devices 34, 35 and 36.

Thereafter, in step 4, the CPU reads data regarding the detected signal of the pump delivery pressure from the sensor 44, data regarding the detected signal of the working oil temperature from the sensor 45, data regarding the detected signal of the engine revolution speed from the sensor 46, data regarding the detected signal of the fuel consumption from the sensor 47*a*, data regarding the detected signal of the engine blowby pressure from the sensor 47*b*, data regarding the detected signal of the engine cooling water temperature from the sensor 47*c*, data regarding the detected signal of the digging pressure from the sensor 48, data regarding the detected signal of the travel pressure from the sensor 49*a*, and data regarding the detected signal of the swing pressure from the sensor 49*b*. Further, the CPU stores and accumulates those read data in the RAM 67 in correspondence to the date and the time-of-day by using the time information from the timer 64.

Then, while it is determined in step 1 that the engine 32 is under run, the CPU calculates an engine run time and stores and accumulates the calculated time in the RAM 67 in correspondence to the date and the time-of-day by using time information from the timer 64 (step 5).

During a period in which the controller network 2 is powered on, the CPU 65 executes the above-described process from step 1 to 5 in units (=cycle) of a predetermined time (e.g., 30 minutes). As a result, the RAM 67 accumulates therein the front operating time, the swing operating time and the travel lever operating time in each predetermined cycle which are obtained in step 3, and an average pump delivery pressure, an average oil temperature, an average engine revolution speed, an average fuel consumption, an average engine blowby pressure, an average cooling water temperature, an average digging pressure and an average travel pressure in each predetermined cycle which are obtained in step 4, as well as an average engine run time which is obtained in step 5 (see FIG. 6).

In addition, for the time data among the above-mentioned data, respective cumulative values totalized with the lapse of each cycle, i.e., a cumulative front operating time, a cumulative swing operating time, a cumulative travel lever operating time, and a cumulative engine run time, are calculated separately and stored in the RAM 67 with updating of the previous data (see FIG. 6).

Further, though not described in detail here, various kinds of event data, such as turning-on/off of the engine and turning-on/off of the key switch, various kinds of alarm data, automatic snapshot data (described in detail later) in the event of issuance of an alarm, etc. are also time-serially stored in the RAM 67 (see FIG. 6).

The most important feature of this embodiment resides in that, in the data recording unit 60, the CPU 65 extracts or computes, from among the operational data stored in the RAM 67, the top priority operational data selected by the supervising side (i.e., the user and the maker, etc.), and transmits the extracted or computed operational data to the supervising side via satellite communication. This feature will be described in more detail below.

Figure 7:
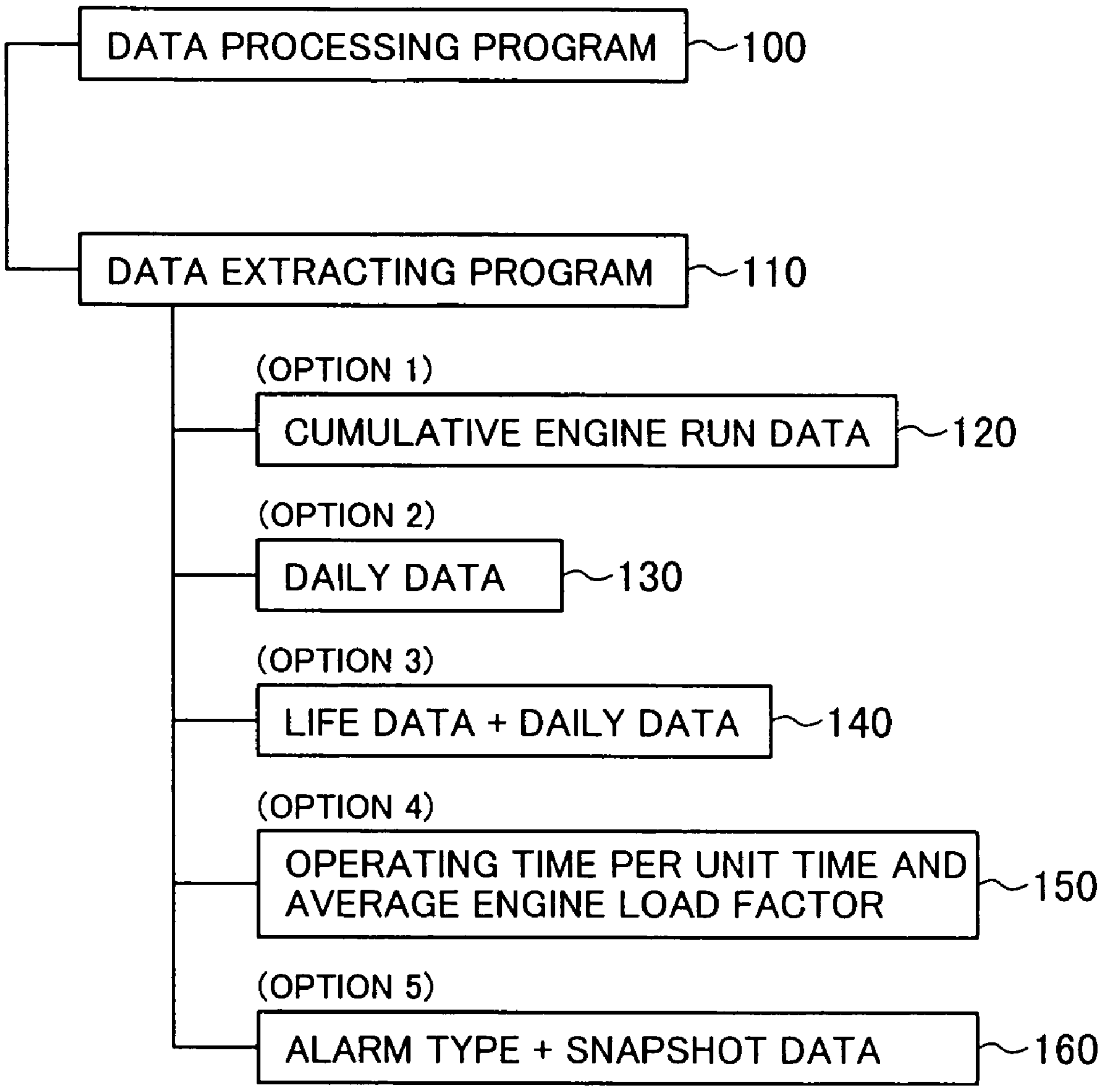
FIG. 7 is a list showing the contents of programs stored in a ROM that constitutes one embodiment of the operational information managing apparatus for the construction machine according to the present invention.

FIG. 7 is a list showing the contents of the programs stored in the ROM 66.

As shown in FIG. 7, the ROM 66 primarily stores therein a data processing program 100 for processing the various kinds of operational information regarding the hydraulic excavator 1, which are inputted via the interfaces 61, 62 and 63, into the predetermined data structure shown in FIG. 6, and a data extracting program 110 for extracting the predetermined operational data from among the operational data thus processed and stored in the RAM 67.

Further, the data extracting program 110 is made up of five programs, i.e., a program 120 for extracting the cumulative engine run time from among the operational data stored in the RAM 67; a program 130 for extracting the predetermined data from among the operational data stored in the RAM 67 and computing daily data (described later); a program 140 for extracting the predetermined data from among the operational data stored in the RAM 67 to prepare life data (described later) and computing daily data; a program 150 for extracting the per-part operating time per unit time (30 minutes in this embodiment) from among the operational data stored in the RAM 67 and computing an average engine load factor (so-called production information); and a program 160 for extracting alarm data and snapshot data regarding the relevant alarm from among the operational data stored in the RAM 67. Those data extracting programs 120 to 160 correspond respectively to options 1 to 5 for an item of extracting the operational data (i.e., a top priority operational data item).

While the option of the top priority operational data item is usually changed in this embodiment with an input applied by the operator from the keypad 56, the present invention is not limited to such a manner. For example, the option may be changed with an input applied from the portable terminal 71 connected to the data recording unit 60. As an alternative, the option may be changed with a remote operation made from the supervising side (i.e., the user and the maker, etc.) via satellite communication. The change of the option with the remote operation is performed, for example, by inputting a selection command signal, which corresponds to the desired option and is inputted from the user-side personal computer 7 or the server 6 on the side of the maker, etc., to the CPU 65 of the data recording unit 60 via the Internet 8, the base station 5, the communication satellite 4, the satellite communication terminal 3, and the communication interface 68.

Corresponding to the option inputted from the keypad 56 or the portable terminal 71, or inputted with the remote operation, the CPU 65 reads the data extracting program out of the ROM 66. More specifically, for example, when the operational data is outputted in the state of the option 1 being selected, the CPU 65 reads the program 120 out of the ROM 66, extracts the cumulative engine run time from among the cumulative data in the operational data stored in the RAM 67, shown in FIG. 6, in accordance with the program 120, and outputs the extracted cumulative engine run time data to the satellite communication terminal 3 via the communication interface 68.

The option 1 is selected in the following situation. Generally, in the field of construction machines, a method for performing maintenance and management of the construction machines is primarily divided into two. According to one method, the maintenance and management are consigned to the maker, etc., and according to the other method, the maintenance and management are performed by customers themselves. In the case employing the former method, since the customer is not engaged in the maintenance and management of the construction machine, there is a need, for example, that the customer wants to know whether the construction machine is operated everyday in a remote site.

In such a case, by selecting the option 1 in this embodiment, the customer can confirm whether the hydraulic excavator 1 is operated everyday, while looking at the cumulative engine run time data transmitted per, e.g., 24 hours, and therefore the need on the customer side can be satisfied. Further, in the case of the option 1 being selected, because the transmitted data is only the cumulative engine run time, it is possible to greatly reduce the data capacity and to greatly cut the communication cost.

On the other hand, when the operational data is transmitted in the state of the option 2 being selected, the CPU 65 reads the program 130 out of the ROM 66, extracts each set of time unit data from among the operational data stored in the RAM 67 in accordance with the program 130, and computes the daily data. Here, the term "daily data" means various kinds of operational data representing detailed behaviors over the range of 1 day, i.e., 24 hours. In other words, the daily data means average data of time unit data 1 to n (n=48 in this embodiment) prepared per unit time (e.g., 30 minutes), shown in FIG. 6, over the range of 24 hours. The CPU 65 extracts the time unit data from among the operational data stored in the RAM 67 to compute the daily data, and outputs the computed daily data to the satellite communication terminal 3 via the communication interface 68.

The option 2 is selected, for example, in the situation where the supervising side (i.e., the customer and the maker, etc.) wants to know fairly detailed operational information everyday for the purpose of maintenance and management. In such a case, by selecting the option 2 in this embodiment, the maker, etc. or the customer can obtain the daily data everyday, confirm a trend of the various kinds of operational data in units of day, and can perform effective diagnosis.

When the operational data is transmitted in the state of the option 3 being selected, the CPU 65 reads the program 140 out of the ROM 66, extracts the life data from among the operational data stored in the RAM 67 in accordance with the program 140, and computes the daily data. Here, the term "life data" means various kinds of cumulative operational data, such as cumulative engine run time and the cumulative per-part operating time, during a period from the start of operation after manufacturing of the hydraulic excavator 1 (e.g., from the time of delivery of the hydraulic excavator). The life data corresponds to the cumulative data in the operational data stored in the RAM 67. Accordingly, the CPU 65 extracts the cumulative data from among the operational data stored in the RAM 67 to obtain the life data, also extracts the time unit data to compute the daily data, and outputs the thus-produced life data and daily data to the satellite communication terminal 3 via the communication interface 68.

The option 3 is selected, for example, in the situation where the supervising side wants to not only confirm a trend of the operational data, but also to perform life management of various components and devices. In such a case, by selecting the option 3 in this embodiment, the supervising side can confirm the various kinds of cumulative data, such as the cumulative operating time, and can predict the life of each of the various components and devices.

When the operational data is transmitted in the state of the option 4 being selected, the CPU 65 reads the program 150 out of the ROM 66, extracts the per-part operating time per unit time (e.g., 30 minutes) from among the operational data stored in the RAM 67 in accordance with the program 150, and computes the average engine load factor. Here, the term "average engine load factor" means a value calculated based on the following formula:

average engine load factor (%)=(fuel consumption per unit time)−(fuel consumption per unit time in no-load state)/({(fuel consumption per unit time in full-load state)−(fuel consumption per unit time in no-load state)}×100

An average fuel consumption in the no-load state and an average fuel consumption in the full-load state in the range of the unit time (e.g., 30 minutes) are stored, for example, in the ROM 66 beforehand (or they may be inputted as the occasion requires). The CPU 65 reads those average fuel consumptions out of the ROM 66, extracts the average fuel consumption in the time unit data from among the operational data stored in the RAM 67, and computes the average engine load factor in accordance with the above formula. Then, the extracted operating time and the computed average engine load factor are outputted to the satellite communication terminal 3 via the communication interface 68.

The option 4 is selected, for example, in the situation where the supervising side wants to know the so-called production information (i.e., the operating time and the average engine load factor per unit time).

When the operational data is transmitted in the state of the option 5 being selected, the CPU 65 reads the program 160 out of the ROM 66, extracts the alarm data from among the event/alarm and other data in the operational data stored in the RAM 67 in accordance with the program 160, and also extracts the snapshot data. The extracted alarm data and snapshot data are both outputted to the satellite communication terminal 3 via the communication interface 68. Considering the case where the same alarm is frequently issued in the same day, the operational data corresponding to the option 5 is outputted only once per day for each type of alarm. Also, when the automatic snapshot is performed, the data recording unit 60 stores, in the RAM 67, the snapshot data for a period of, e.g., 6 minutes (5 minutes and 1 minute respectively before and after the occurrence of the alarm). This however results in a large data capacity. In this embodiment, therefore, the snapshot data for a period, e.g., 10 seconds after the occurrence of the alarm, is extracted from among the stored snapshot data and then outputted.

The option 5 is selected, for example, in the situation where, upon the occurrence of an alarm in the hydraulic excavator 1, the supervising side wants to know the occurrence of the alarm in an as close as possible real-time way. With this embodiment, when the option 5 is selected, the alarm data and the snapshot data regarding the relevant alarm are transmitted to the supervising side in the next transmission step after the occurrence of the alarm. As a result, the occurrence of the alarm can be informed to the supervising side in a nearly real-time way, and the supervising side can analyze the cause of the alarm occurrence based on diagnosis of the transmitted snapshot data.

When the operational data corresponding to each option is outputted from the CPU 65 to the satellite communication terminal 3 as described above, each set of operational data is prepared in the form of a file for each transmission. More specifically, by way of example, a file header is placed at the beginning of the file. The file header includes machine body data, such as the machine number of the relevant hydraulic excavator 1, and the transmission time-of-day (indicated on the basis of any standard time, for example, along with time lag information when the relevant hydraulic excavator is operated oversea). Further, the position data of the relevant hydraulic excavator 1 is added in, e.g., the file header by the GPS module 72.

The operational data thus prepared in the form of a transmission file is transmitted from the satellite communication terminal 3 and is received by the base station 5 via the satellite 4. The operational data received by the base station 5 is sent as, e.g., E-mail to each of the server 6 on the side of the maker, etc. and the user-side personal computer 7 via the communication line 8. Instead of directly sending the operational data from the base station 5 to the user-side personal computer 7 as mentioned above, the operational data may be sent to only the server 6 on the side of the maker, etc. from the base station 5 and then sent to the user-side personal computer 7 from the server 6 on the side of the maker, etc.

While the data transmission made by the CPU 65 to the supervising side via satellite communication may be performed, e.g., everyday as a daily report per 24 hours, the transmission cycle is optionally changeable as required in this embodiment. More specifically, the transmission cycle can be changed, for example, in response to an input applied from the keypad 56 by the operator, etc., or an input applied from the portable terminal 71 connected to the data recording unit 60, or an input applied with the remote operation from the supervising side via satellite communication.

The operational data received by the server 6 on the side of the maker, etc. or the user-side personal computer 7 is processed by an application program previously installed in the server 6 or the personal computer 7, and is displayed in a predetermined format as service information that represents the operating situation.

Figure 8:
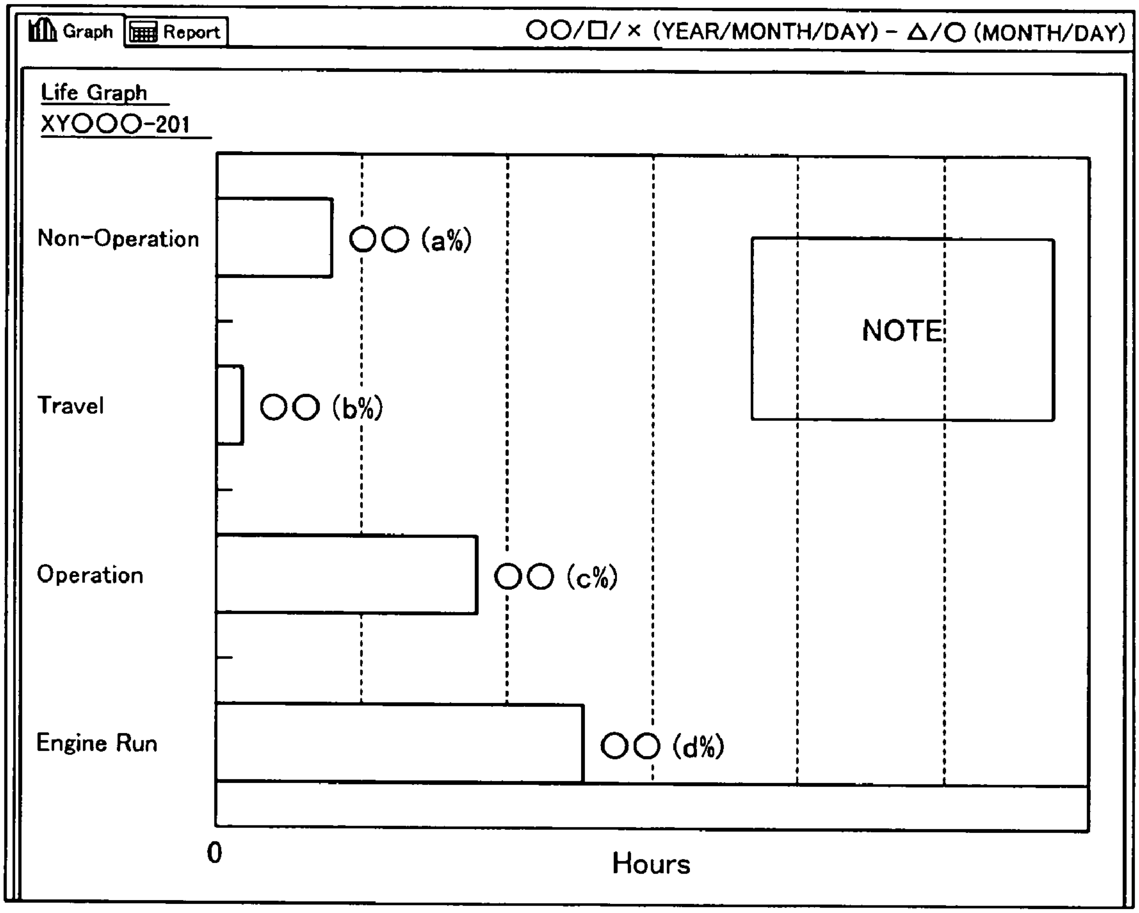
FIG. 8 shows, in the form of a graph, one example of life data displayed on a maker-side server and a user-side personal computer when an option 3 is selected.

FIGS. 8 and 9 each show one example of life data displayed on the server 6 and the user-side personal computer 7, for example, when the option 3 is selected. The life data is shown in the form of a graph in FIG. 8, and in the form of a list in FIG. 9.

In the example of FIG. 8, the horizontal axis represents time (hours). The non-operation time, the travel lever operating time, the operation lever operating time, the cumulative engine run time are displayed as bar graphs in this order from above in colors preferably different from one another. In addition, respective values of the non-operation time, the travel lever operating time, the operation lever operating time, and the cumulative engine run time are also displayed as numerals rightward of ends of the corresponding bar graphs. It is therefore possible to know the operating time per part totalized from the time of delivery of the hydraulic excavator 1, and to perform assessment of the hydraulic excavator 1 in a detailed manner.

Additionally, respective values of a non-operation time percentage (a %), a travel lever operating time percentage (b %), an operation lever operating time percentage (c %), and a cumulative engine run time percentage (d %=100%) are also displayed as numerals on condition that the cumulative engine run time is 100[%]. This display enables data comparison to be easily made among a plurality of hydraulic excavators 1 differing in engine run time from one another.

Furthermore, on the right side of the bar graphs, a "Note" space is prepared so that the operator can write a memo therein. Thus, the operator can report, as a memo, even the matter that cannot be expressed in the form of a graph.

At an upper left corner of the screen, two tags "Graph" and "Report" are displayed in a selectable manner allowing the operator to select the data of the same contents in the form of a graph or a list with numerical values (FIG. 8 shows the case where the tag "Graph" is selected). This facilitates switching in display form between graph and numerical value data, i.e., an operation for changing the display form in a reversed direction. At an upper right corner of the screen, a data period is displayed as indicated by "○○/□/x (year/month/day)–Δ/○ (month/day)" so that the operator can confirm the currently displayed at a glance.

In FIG. 9, the contents displayed in 8 in the form of a graph, i.e., the respective values of the non-operation time, the travel lever operating time, the operation lever operating time, and the cumulative engine run time, are displayed as the numerical value data. Also in this screen, as in the screen of FIG. 8, a "Note" space is prepared for the sake of operator's convenience.

Figure 10:
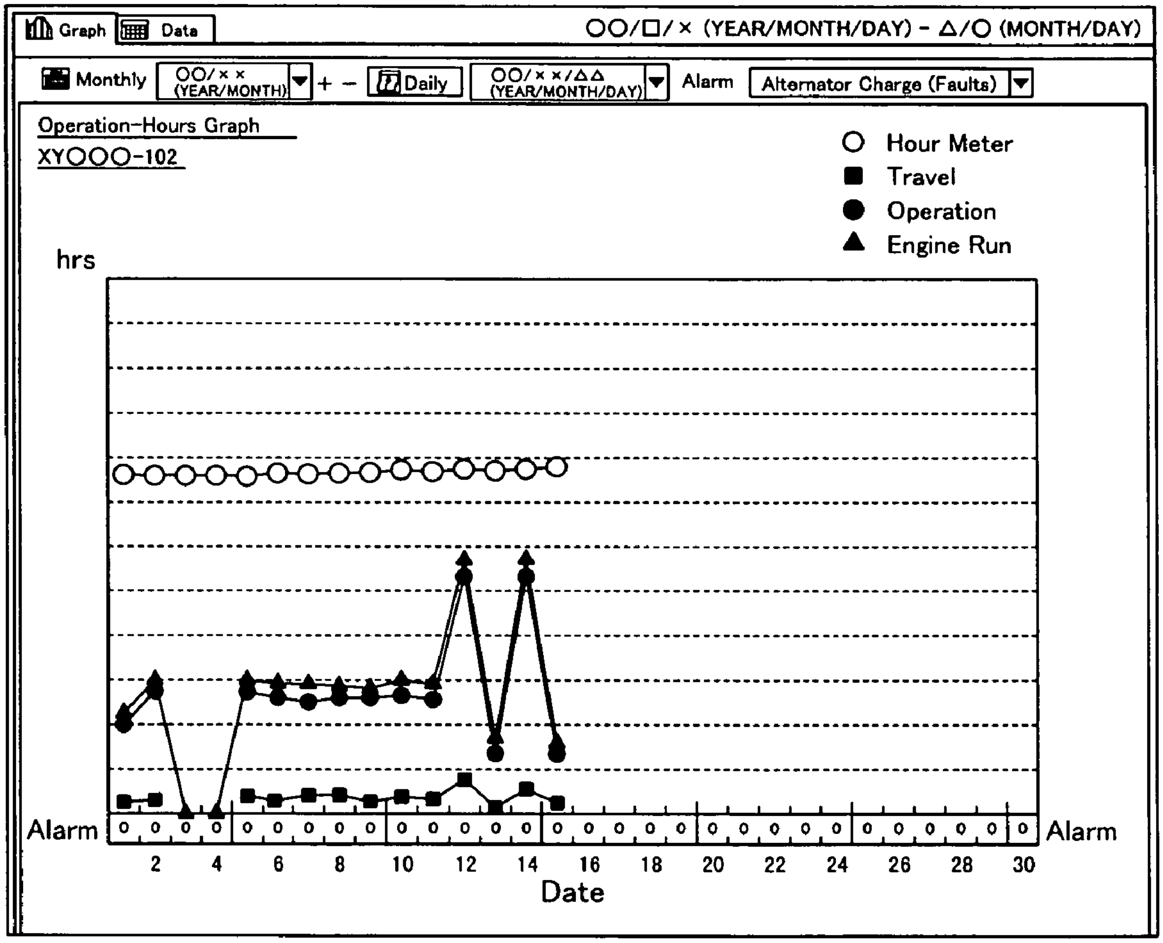
FIG. 10 is a graph showing one example of daily data displayed on the maker-side server and the user-side personal computer when the option 3 is selected.

FIG. 10 is a graph showing one example of daily data displayed on the server 6 and the user-side personal computer 7, for example, when the option 3 is selected.

In the example of FIG. 10, the vertical axis represents time (hours), and the horizontal axis represents date (from the first to thirtieth day of a target month). The cumulative engine run time, the cumulative operation lever operating time, and the cumulative travel lever operating time per day are displayed as line graphs in colors preferably different from one another. This display is useful for machine management because the operator can look changes in operation contents of the hydraulic excavator per day.

Further, in the example of FIG. 10, the cumulative engine run time (Hour Meter) is also displayed as the life data, and a vertical axis representing the Hour Meter is set on the right side. This vertical axis is defined, for example, such that a value of the Hour Meter is fixed to a predetermined time t (e.g., t=1200 hours) starting from the beginning of the target month (in other words, a scale of the vertical axis is fixed). With such display, contrast in behaviors between the progress (gradient) of the Hour Meter and the per-part operating time can be easily compared among a plurality of hydraulic excavators, and a proper maintenance schedule can be planned.

Figure 11:
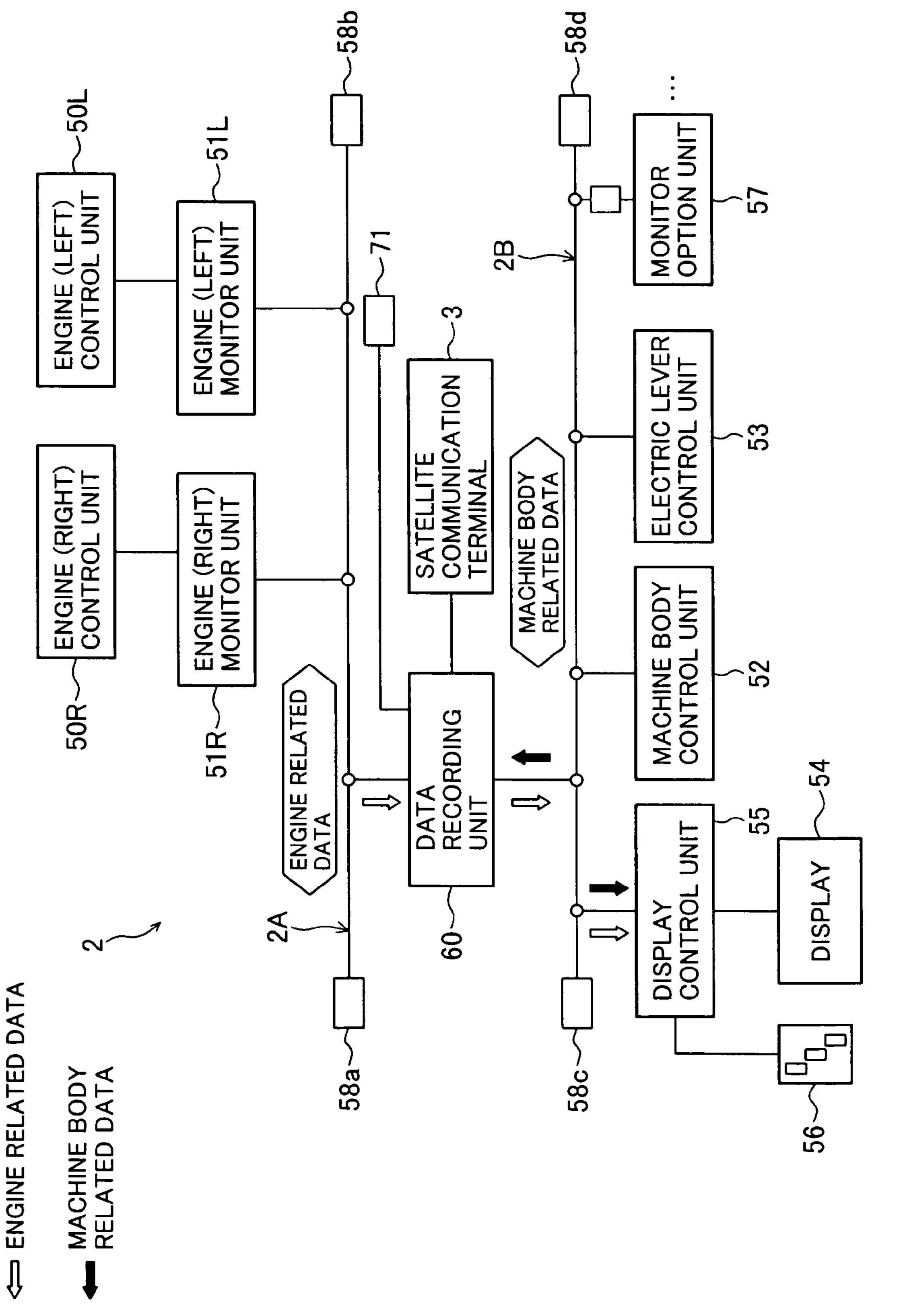
FIG. 11 is a diagram showing a flow of the operational data around the data recording unit in a network controller that constitutes one embodiment of the operational information managing system for the construction machine according to the present invention.

The controller network 2 described above is constructed such that networks separated into two lines, i.e., the first and second networks 2A, 2B, are connected to each other by the data recording unit 60. The data recording unit 60 serves to transfer the operational data between the first and second networks 2A, 2B. FIG. 11 is a diagram showing a flow of the operational data around the data recording unit 60 in the network controller 2. In FIG. 11, white arrows represent a flow of engine related data flowing over the first network 2A, and black arrows represent a flow of machine body related data flowing over the second network 2B.

As shown in FIG. 11, the data recording unit 60 transfers the engine related data from the first network 2A to the second network 2B. Then, the engine related data is inputted to the display control unit 55 via the second network 2B, and the inputted engine related data is displayed on the display 54 under control of the display control unit 55. On the other hand, the machine body related data flowing over the second network 2B is inputted to the display control unit 55 connected to the second network 2B and is displayed on the display 54, while the machine body related data is prevented from flowing into the first network 2A.

Another feature of this embodiment resides in that the snapshot function is given in each of the data recording unit 60 and the display control unit 55. This feature will be described below. The snapshot function used herein is divided into two types depending on a trigger to start the snapshot, i.e., automatic snapshot and manual snapshot.

More specifically, in the controller network 2, the engine related data on the first and second networks 2A, 2B and the machine body related data on the second network 2B flow over the networks while being updated per certain period (e.g., 1 second). The data recording unit 60 and the display control unit 55 record, for each certain time (e.g., 5 minutes), the engine related data and the machine body related data both flowing over the networks at all times with updating of the previous data.

When an alarm occurs in that condition, the data recording unit 60 and the display control unit 55 extract and store, from among the engine related data and the machine body related data both recorded for the certain time as mentioned above, predetermined operational data regarding the occurred alarm (items of the predetermined operational data are stored in, e.g., the ROM 66 of the data recording unit 60 or a ROM (not shown) of the display control unit 55). In addition, the units 60, 55 extract and store, from among the engine related data and the machine body related data in the range of a certain time (e.g., 1 minute) after the occurrence of the alarm, predetermined operational data regarding the occurred alarm. Stated another way, the predetermined operational data regarding the occurred alarm and falling in a period of 5 minutes before the occurrence of the alarm and 1 minute after the occurrence of the alarm is stored as the snapshot data. This is the automatic snapshot function.

On the other hand, the manual snapshot function is the function of manually starting the snapshot with the manipulation of, e.g., the keypad 56 when the operator feels awkward by intuition during the operation, for example, and of executing the snapshot continuously within the range of a memory-allowable maximum time (e.g., 30 minutes) until an end command is inputted from the keypad 56. Data items collected with the manual snapshot function can be selected, for example, with the manipulation of the keypad 56 by the operator looking at the display.

Thus, for example, when the operator wants to look the snapshot data recorded with the automatic snapshot function or the manual snapshot function in the cab 14, the snapshot data stored in the display control unit 55 is displayed on the display 54 with the manipulation of the keypad 56 by the operator. Meanwhile, when the option 5 is selected to transmit the snapshot data via satellite communication, or when the snapshot data is to be downloaded in the portable terminal 71, etc., the snapshot data stored in the data recording unit 60 (e.g., the RAM 67) is transmitted. In any of the case displaying the snapshot data on the display 54 and the case transmitting it via satellite communication, therefore, the snapshot data having a large capacity is avoided from flowing between the data recording unit 60 and the display control unit 55 over the second network 2B. As a result, it is possible to prevent an adverse influence from acting on the engine related data and the machine body related data, which flow over the second network 2B at all times while being updated.

Figure 12:
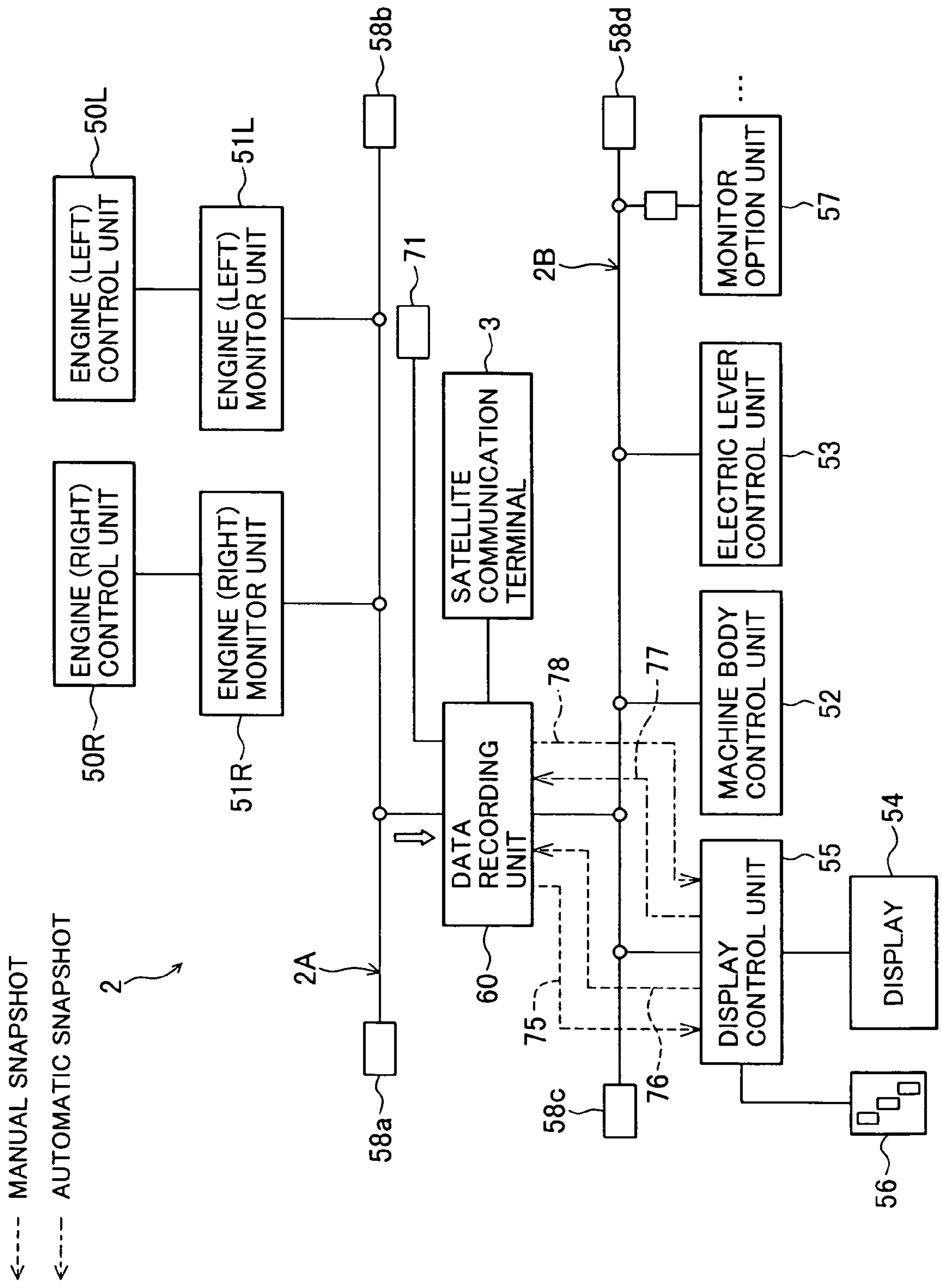
FIG. 12 is a diagram showing a manner of to keeping synchronization of snapshot between the data recording unit and a display control unit that constitute one embodiment of the operational information managing system for the construction machine according to the present invention.

When the snapshot is performed in both of the data recording unit 60 and the display control unit 55 as in this embodiment, the timings of starting the snapshot must be matched with each other. A manner of making the start timings matched with each other will be described below with reference to FIG. 12.

In the case of the automatic snapshot, the data recording unit 60 first determines whether an alarm has occurred. Then, if the occurrence of the alarm is detected, the data recording unit 60 sends a snapshot start signal (indicated by a broken-line arrow 75 in FIG. 12) to the display control unit 55. When the display control unit 55 receives the snapshot start signal in a normal way, it sends an answer signal (indicated by a broken-line arrow 76 in FIG. 12) to the data recording unit 60 and starts the snapshot. When the data recording unit 60 receives the answer signal from the display control unit 55 in a normal way, it starts the snapshot. As a result, the timings of starting the automatic snapshot in the data recording unit 60 and the display control unit 55 can be matched with each other.

In the case of the manual snapshot, the display control unit 55 first determines whether a command to start the snapshot is inputted from the keypad 56. Then, if the command is inputted, the display control unit 55 sends a snapshot start signal (indicated by a chain-line arrow 77 in FIG. 12) to the data recording unit 60. When the data recording unit 60 receives the snapshot start signal in a normal way, it sends an answer signal (indicated by a chain-line arrow 78 in FIG. 12) to the display control unit 55 and starts the snapshot. When the display control unit 55 receives the answer signal from the data recording unit 60 in a normal way, it starts the snapshot. As a result, the timings of starting the manual snapshot in the data recording unit 60 and the display control unit 55 can be matched with each other.

While the above-mentioned signals 75 to 78 are transferred between the data recording unit 60 and the display control unit 55 via the second network 2B in this embodiment, a separate signal line solely dedicated for those signals may be provided as another example.

Advantageous effects obtained with one embodiment of the thus-constructed operational information managing apparatus according to the present invention and the operational information managing system for the construction machine equipped with the apparatus will be described below for each item of the effects.

(1) Effect of Suppressing Reduction of Productivity by Presenting Top Priority Data With this embodiment, as described above, plural kinds of operational data (i.e., the engine related data and the machine body related data) regarding the operating status of the hydraulic excavator 1 are transmitted to the supervising side (i.e., the user and the maker, etc.) via satellite communication.

With the related art wherein detailed operational data regarding the operating status of the hydraulic excavator are all transmitted to the supervising side from the viewpoint of reducing the downtime, a very long processing time is required to make diagnosis of the operating situation on the supervising side, and the hydraulic excavator may be brought into rest during work while the processing is executed. In particular, when managing a plurality of hydraulic excavators, such a potential risk is increased, and the management equipment and cost required for the diagnosis are also increased.

In contrast, according to this embodiment, among the operational data (i.e., the engine related data and the machine body related data) regarding the operating status of the hydraulic excavator 1, only the operational data corresponding to one of the options 1-5 selected on the supervising side is transmitted satellite communication. This enables selective presentation of the top priority operational data, which may bring the hydraulic excavator 1 into rest and is truly required by the supervising side. As a result, it is possible to eliminate the drawback experienced with the related art, i.e., to avoid the hydraulic excavator from being brought into rest during work while the operational data is processed for diagnosis, and to suppress a reduction of productivity caused by the rest of the hydraulic excavator. In addition, the management equipment and cost required for the diagnosis can be reduced.

(2) Effect of Further Suppressing Reduction of Productivity with Capability of Optionally Changing of Transmission Cycle With this embodiment, as described above, the cycle of transmitting the operational data from the hydraulic excavator 1 to the supervising side can be optionally changed, as required, from the keypad, the portable terminal, or with the remote operation, etc. Therefore, for example, when the operational data (daily report) provided everyday per 24 hours is not sufficient and the supervising side wants to more finely confirm the operating situation of the hydraulic excavator 1 at a shorter cycle (e.g., per several hours), such a demand can be coped with by setting the transmission cycle to a shorter one. Conversely, for example, when the daily report is not necessary and the supervising side is just required to confirm the operating situation at intervals of several days and wants to cut the communication cost correspondingly, such a demand can be coped with by setting the transmission cycle to a longer one. Thus, according to this embodiment, the top priority operational data can be provided flexibly in responsive to the need on the supervising side. It is hence possible to make soundness diagnosis of the hydraulic excavator 1 in a more effective manner, and to further suppress a reduction of productivity caused by the rest of the hydraulic excavator.

(3) Effect of Increasing Extensibility with Unit-Distributed and Two-Line-Separated Structure of Network In this embodiment, the controller network 2 has a unit-distributed structure in which control units are separately disposed depending on individual functions. This makes the network flexibly adaptable, for example, such that when a new function is added to the controller network 2, a control unit for the new function is added, and when a predetermined function is not required, a control unit for the predetermined function is removed. As compared with a structure in which a plurality of functions are provided in a single unit, not only function extensibility, but also versatility can be improved. Further, control units for performing control and monitoring with regards to the engine are disposed in the first network 2A in a concentrated way, and other control units for performing control and monitoring with regards to the machine body of the hydraulic excavator 1 are disposed in the second network 2B in a concentrated way, thus resulting in a network configuration separated into two systems. Then, by setting, e.g., data communication methods for the respective networks in different modes from each other, it is possible to take in respective data based on the different communication methods, and to improve the data extensibility. Further, with this embodiment, since the machine body related data is not transmitted from the second network 2B to the first network 2A, the bus occupancy rate of the first network 2A can be reduced.

(4) Effect of Reducing Bus Occupancy Rate with Doubling of Snapshot Function

In this embodiment, as described above, the snapshot function is given in each of the data recording unit 60 and the display control unit 55. More specifically, when the snapshot data is displayed on the display 54, the snapshot data stored in the display control unit 55 is used. When the snapshot data is transmitted to the supervising side via satellite communication, or when the snapshot data is downloaded in the portable terminal 71, etc., the snapshot data stored in the data recording unit 60 is used. In any of the case displaying the snapshot data on the display 54 or the case transmitting it via satellite communication or downloading it, therefore, the snapshot data having a large capacity can be avoided from flowing between the data recording unit 60 and the display control unit 55 over the second network 2B. As a result, it is possible to prevent an adverse influence on the engine related data and the machine body related data, which flow over the second network 2B at all times while being updated. Hence, the transmission, the downloading, etc. of the snapshot can be performed without impairing display of the operating status, etc. on the display 54 during ordinary work.

While, in the first embodiment of the present invention described above, the top priority operational data regarding the hydraulic excavator 1 is decided with selection of one of the preset options 1-5 made from the supervising side, the present invention is not limited to that embodiment. For example, the item of the top priority operational data may be optionally selected, for example, with an input from the keypad 56 or the portable terminal 71, or with the remote operation via satellite communication from the supervising side.

Further, while the hydraulic excavator 1 has been described in one embodiment of the present invention, taking as an example the so-called large-sized excavator or super-large-sized excavator including two engines and belonging to a class with the body weight of several hundreds tons, applications of the present invention are not limited to such an example. As a matter of course, the large-sized hydraulic excavator may be of the type including one engine. Further, the present invention is also applicable to not only the so-called medium-sized excavator in a class with the body weight of several tens tons, which is most popularly employed in various kinds of construction work sites, etc. in Japan, but also the so-called mini-excavator which has a smaller size and is employed in small-scaled construction work sites.

INDUSTRIAL APPLICABILITY

According to the present invention, plural kinds of operational information regarding a construction machine are taken in as operational data in storage means, and from among the plural kinds of operational data stored in the storage means, top priority operational data is extracted and transmitted to the supervising side by control means. Unlike the related art wherein detailed operational data regarding the operating status are all transmitted to the supervising side from the viewpoint of reducing the downtime, the top priority operational data which may bring the hydraulic excavator into rest and is truly required by the supervising side can be selectively presented to the supervising side. As a result, it is possible to eliminate the drawback experienced with the related art, i.e., the disadvantage that a very long processing time is required to make diagnosis on a large amount of the operational data and the hydraulic excavator may be brought into rest during work while the processing is executed, and to suppress a reduction of productivity caused by the rest of the construction machine. In addition, the management equipment and cost required for the diagnosis can be reduced.

The invention claimed is:

1. An operational information managing apparatus for use in a construction machine to manage operating situations of said construction machine, wherein said apparatus comprises:

a first storage unit for storing operational data regarding said construction machine;

a second storage unit for storing a first program for extracting a cumulative run time of an engine from among said operational data stored in said first storage unit, a second program for extracting a per-part operating time per unit time from among said operational data stored in said first storage unit, and a third program for extracting alarm data and snapshot data regarding a relevant alarm from among said operational data stored in said first storage unit; and a control unit for reading a data extracting program from among said programs stored in said second storage unit corresponding to a remote operation made from a supervising side via information communication, extracting top priority operational data from among said operational data stored in said first storage unit in accordance with said data extracting program, and transmitting said top priority operational data to said supervising side via information communication.

2. The operational information managing apparatus for the construction machine according to claim 1, wherein said second storage unit stores a fourth program for computing a daily data from among said operational data stored in said first storage unit, and a fifth program for computing a life data and a daily data from among said operational data stored in said first storage unit.

3. The operational information managing apparatus for the construction machine according to claim 1, wherein said data extraction program read by said control unit can be changed with an input applied by an operator of said constriction machine from a keypad, or an input applied from a portable terminal connected to said operational information managing apparatus, or said remote operation made from said supervising side via information communication.

4. The operational information managing apparatus for the construction machine according to claim 1, wherein a transmission cycle of said top priority operational data can be changed.

5. The operational information managing apparatus for the construction machine according to claim 1, wherein said control unit sends a snapshot start signal to a display control unit for executing control related to display made on a display means on an occurrence of said alarm is detected.

6. The operational information managing apparatus for the construction machine according to claim 1, wherein said first storage unit takes in and stores, as the operational data of said construction machine, a first kind of operational data regarding the operating status of an engine and a second kind of operational data regarding a body of said construction machine and the operating status of an electric lever thereof.

7. An operational information managing system for a construction machine, said system comprising:

an operational information managing apparatus for use in said construction machine to manage operating situations of said construction machine; and a remote terminal apparatus connected to said operational information managing apparatus via information communication;

wherein said operational information managing apparatus comprises:

a first storage unit for storing operational data regarding said construction machine;

a second storage unit for storing a first program for extracting a cumulative run time of an engine from among said operational data stored in said first storage unit, a second program for extracting a per-part operating time per unit time from among said operational data stored in said first storage unit, and a third program for extracting alarm data and snapshot data regarding a relevant alarm from among said operational data stored in said first storage unit; and a control unit for reading a data extracting program from among said programs stored in said second storage unit corresponding to a remote operation made from said remote terminal apparatus, extracting top priority operational data from among said operational data stored in said first storage unit in accordance with said data extracting program, and transmitting said top priority operational data to said remote terminal apparatus via information communication.

* * * * *